(12) United States Patent
Burbank et al.

(10) Patent No.: US 10,897,520 B2
(45) Date of Patent: Jan. 19, 2021

(54) CONNECTED CONTACT IDENTIFICATION

(71) Applicant: salesforce.com, inc., San Francisco, CA (US)

(72) Inventors: Noah William Burbank, Palo Alto, CA (US); Gabriel Starr Krupa, Petaluma, CA (US); Bradford William Powley, Palo Alto, CA (US); Alexis Roos, Palo Alto, CA (US)

(73) Assignee: salesforce.com, inc., San Francisco, CA (US)

( * ) Notice: Subject to any disclaimer, the term of this patent is extended or adjusted under 35 U.S.C. 154(b) by 154 days.

(21) Appl. No.: 16/262,488

(22) Filed: Jan. 30, 2019

(65) Prior Publication Data

US 2020/0153934 A1 May 14, 2020

Related U.S. Application Data

(60) Provisional application No. 62/759,932, filed on Nov. 12, 2018.

(51) Int. Cl.
*G06F 16/00* (2019.01)
*H04L 29/08* (2006.01)
*G06F 16/901* (2019.01)
*G06Q 30/00* (2012.01)

(52) U.S. Cl.
CPC ........ *H04L 67/306* (2013.01); *G06F 16/9024* (2019.01); *G06Q 30/016* (2013.01)

(58) Field of Classification Search
CPC .................................................. G06F 16/9024
See application file for complete search history.

(56) References Cited

U.S. PATENT DOCUMENTS

2009/0172773 A1\* 7/2009 Moore ................ G06F 21/6254
726/1

\* cited by examiner

*Primary Examiner* — Ajith Jacob
(74) *Attorney, Agent, or Firm* — Holland & Hart LLP

(57) ABSTRACT

A database server may analyze interaction data including communication to generate a graph representation of various users and connections between the users. The database server may utilize the graph representation of connections to identify sufficiently connected target user identifiers in one or more external organizations. A connection metric may be assigned to each user identifier of one or more groups of user identifiers generated using the graph representation, and the target user identifiers may be identified based on the connection metrics.

20 Claims, 10 Drawing Sheets

CONNECTED CONTACT IDENTIFICATION

CROSS REFERENCE

The present application for Patent claims priority to U.S. Provisional Patent Application No. 62/759,932 by Burbank et al., entitled "Connected Contact Identification," filed Nov. 12, 2018, which is assigned to the assignee hereof and expressly incorporated by reference herein.

FIELD OF TECHNOLOGY

The present disclosure relates generally to database systems and data processing, and more specifically to connected contact identification.

BACKGROUND

A cloud platform (i.e., a computing platform for cloud computing) may be employed by many users to store, manage, and process data using a shared network of remote servers. Users may develop applications on the cloud platform to handle the storage, management, and processing of data. In some cases, the cloud platform may utilize a multi-tenant database system. Users may access the cloud platform using various user devices (e.g., desktop computers, laptops, smartphones, tablets, or other computing systems, etc.).

In one example, the cloud platform may support customer relationship management (CRM) solutions. This may include support for sales, service, marketing, community, analytics, applications, and the Internet of Things. A user may utilize the cloud platform to help manage contacts of the user. For example, managing contacts of the user may include analyzing data, storing and preparing communications, and tracking opportunities and sales.

A user of the cloud platform may want to identify persons from outside organizations that have "influence" within their organization and/or are willing to communicate outside their organization. Systems may not have the ability to utilize known communication or interaction data to identify connected people in such ways, because data corresponding to outside communications may not be readily available. Further, current systems may not have robust connections graphs that may be used to identify such persons, or current systems may not include communication data that is structured in a way that makes it readily available.

DETAILED DESCRIPTION

Figure 1:
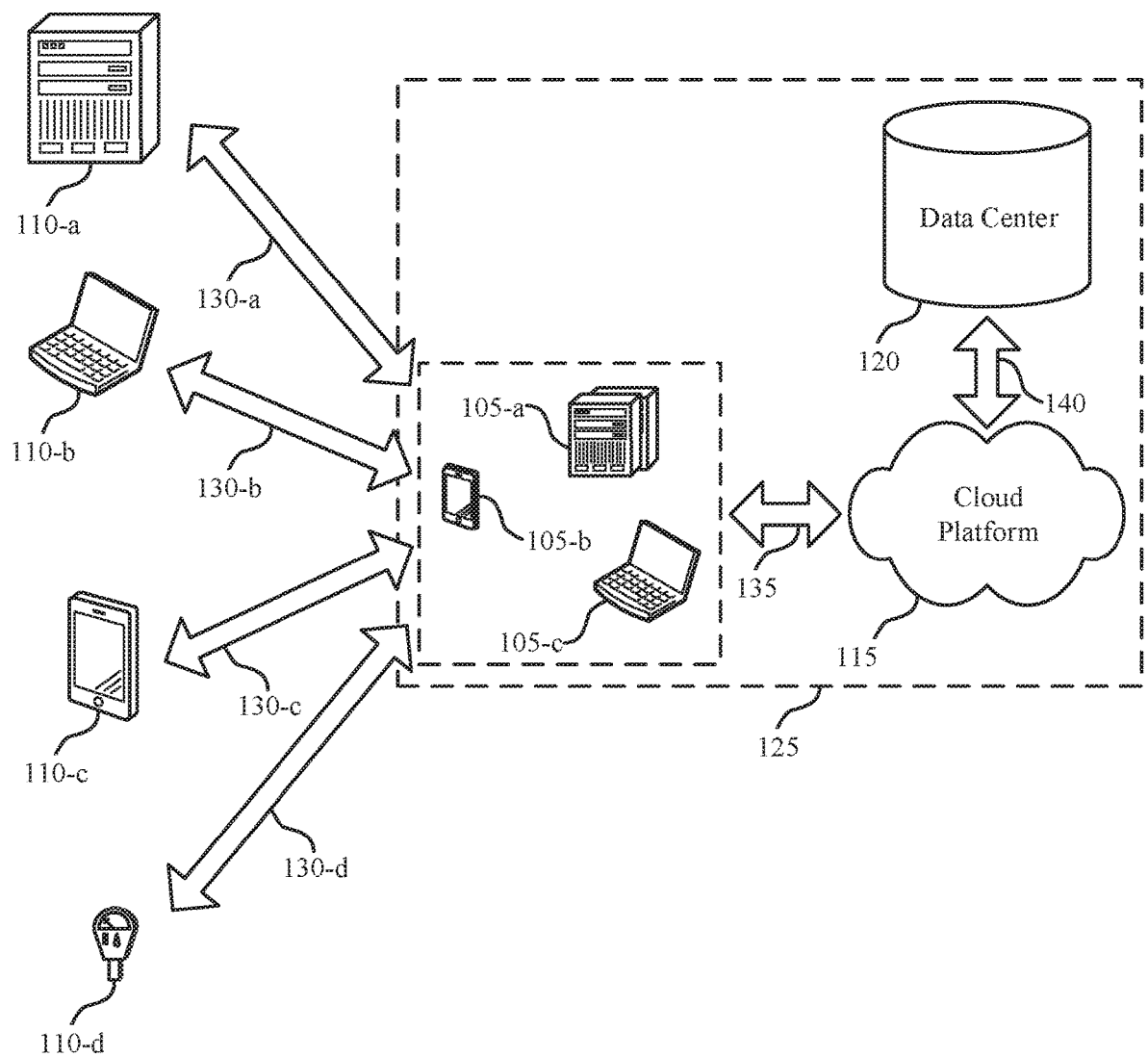
FIG. 1 illustrates an example of a system for data processing that supports connected contact identification in accordance with aspects of the present disclosure.

In some database systems, users (e.g., individuals distinct from other users based on any number of characteristics, such as name, email address, phone number, etc.) may operate within a group referred to as an organization. Within the organization, the users may share data, communicate, and operate as separate components of a single entity. For example, in a sales scenario, the users may be individual salespeople working to generate profits for a company (e.g., the organization or entity). These users may communicate and interact with other contacts—referred to as targets—who may be outside the organization.

The database system may host a "connected contact identification" service on one or more database servers or server clusters. The connected contact identification service or an associated service may process communication messages associated with the users and targets to generate a graph. The communication messages may include emails, calendar events, service tickets, text messages, voice calls, social media messages, documents, activities, or any combination of these. The service may perform a natural language processing (NLP) analysis on the communication messages to extract metadata or other information, such as timestamps, associated users, or styles of the communication messages. The service may use the extracted information to generate a graph (e.g., using batches of communication messages stored in memory) or update an existing graph (e.g., using realtime or pseudo-realtime communication messages streams). The graph may represent the relationships within an organization, as well as relationships with targets external to the organization. For example, the nodes of the graph may represent users and targets, and the edges of the graph may represent connections, along with corresponding connection strength values, between the users, targets, and other users or targets associated with the targets.

The connected contact identification service may utilize this graph to provide a user of a source organization with insights into which user or users within a target organization are sufficiently well-connected to be identified as a target user. For example, a user may send a request message to the connected contact identification service to retrieve information about users connected to a specified target organization. The connected contact identification service may utilize the graph to calculate connection metrics for the users within the target organization. The service may identify a set of user identifiers corresponding to target contacts based on the connection metrics and transmit an indication of the target identifiers to a user device associated with the requesting user. Having target contacts with strong connections, as opposed to target contacts with no communication history with the targets, may greatly increase the chances of a successful communication (e.g., receiving a reply in response, scheduling a meeting, making a sale, influencing a decision maker, etc.). Furthermore, because no direct communication data may be available for the target organization (e.g., direct communication data between contacts within the target organization), the service utilizes communication data between contacts of the source organization and contacts of the target organization to identify the connection metrics. For example, communications between contacts of the target organization may copy (e.g., "cc") users of the source organization and thus may be detectable by the service and used to populate the graph. Thus, indirect and direct communication data associated with the target organization are utilized to identify connected targets within the organization.

The connected contact identification service may thin the graph into many groups of users, such that the service may identify connected targets within each group. Thus, in some cases, each disconnected group (e.g., the groups may not be connected to one another via edges) may not include user identifiers associated with the source organization as well as other user identifiers. In other words, the service may remove the source organization user identifiers from the graph to generate the groups. While or after generating the groups, the service may consider whether each groups satisfies certain constraints (e.g., maximum and minimum group size). If a group does not satisfy one or more constraints, then the group may not be considered for identifying a connected target contact. In some cases, the service generates the connection metrics for identifiers within each group based on interaction factors such as recency of communication, frequency of communication, type of interaction, timing of interaction, or a combination thereof. For example, the service may provide greater weight to connections corresponding to emails than to telephone calls. In some cases, the service outputs a human readable rationale to inform a user why a particular target contact was identified.

Aspects of the disclosure are initially described in the context of an environment supporting an on-demand database service. Aspects are further described in the context of system diagrams and a process flow diagram. Aspects of the disclosure are further illustrated by and described with reference to apparatus diagrams, system diagrams, and flowcharts that relate to connected contact identification.

FIG. 1 illustrates an example of a system 100 for cloud computing that supports connected contact identification in accordance with various aspects of the present disclosure. The system 100 includes cloud clients 105, contacts 110, cloud platform 115, and data center 120. Cloud platform 115 may be an example of a public or private cloud network. A cloud client 105 may access cloud platform 115 over network connection 135. The network may implement transfer control protocol and internet protocol (TCP/IP), such as the Internet, or may implement other network protocols. A cloud client 105 may be an example of a user device, such as a server (e.g., cloud client 105-a), a smartphone (e.g., cloud client 105-b), or a laptop (e.g., cloud client 105-c). In other examples, a cloud client 105 may be a desktop computer, a tablet, a sensor, or another computing device or system capable of generating, analyzing, transmitting, or receiving communications. In some examples, a cloud client 105 may be operated by a user that is part of a business, an enterprise, a non-profit, a startup, or any other organization type.

A cloud client 105 may interact with multiple contacts 110. The interactions 130 may include communications, opportunities, purchases, sales, or any other interaction between a cloud client 105 and a contact 110. Data may be associated with the interactions 130. A cloud client 105 may access cloud platform 115 to store, manage, and process the data associated with the interactions 130. In some cases, the cloud client 105 may have an associated security or permission level. A cloud client 105 may have access to certain applications, data, and database information within cloud platform 115 based on the associated security or permission level, and may not have access to others.

Contacts 110 may interact with the cloud client 105 in person or via phone, email, web, text messages, mail, or any other appropriate form of interaction (e.g., interactions 130-a, 130-b, 130-c, and 130-d). The interaction 130 may be a business-to-business (B2B) interaction or a business-to-consumer (B2C) interaction. A contact 110 may also be referred to as a customer, a potential customer, a lead, a client, or some other suitable terminology. In some cases, the contact 110 may be an example of a user device, such as a server (e.g., contact 110-a), a laptop (e.g., contact 110-b), a smartphone (e.g., contact 110-c), or a sensor (e.g., contact 110-d). In other cases, the contact 110 may be another computing system. In some cases, the contact 110 may be operated by a user or group of users. The user or group of users may be associated with a business, a manufacturer, or any other appropriate organization.

Cloud platform 115 may offer an on-demand database service to the cloud client 105. In some cases, cloud platform 115 may be an example of a multi-tenant database system. In this case, cloud platform 115 may serve multiple cloud clients 105 with a single instance of software. However, other types of systems may be implemented, including—but not limited to—client-server systems, mobile device systems, and mobile network systems. In some cases, cloud platform 115 may support CRM solutions. This may include support for sales, service, marketing, community, analytics, applications, and the Internet of Things. Cloud platform 115 may receive data associated with contact interactions 130 from the cloud client 105 over network connection 135, and may store and analyze the data. In some cases, cloud platform 115 may receive data directly from an interaction 130 between a contact 110 and the cloud client 105. In some cases, the cloud client 105 may develop applications to run on cloud platform 115. Cloud platform 115 may be implemented using remote servers. In some cases, the remote servers may be located at one or more data centers 120.

Data center 120 may include multiple servers. The multiple servers may be used for data storage, management, and processing. Data center 120 may receive data from cloud platform 115 via connection 140, or directly from the cloud client 105 or an interaction 130 between a contact 110 and the cloud client 105. Data center 120 may utilize multiple redundancies for security purposes. In some cases, the data stored at data center 120 may be backed up by copies of the data at a different data center (not pictured).

Subsystem 125 may include cloud clients 105, cloud platform 115, and data center 120. In some cases, data processing may occur at any of the components of subsystem 125, or at a combination of these components. In some cases, servers may perform the data processing. The servers may be a cloud client 105 or located at data center 120.

In some systems 100, multiple cloud clients 105 may be part of a same organization or tenant. The cloud platform 115 and data center 120 may service multiple separate organizations or tenants (e.g., within a multi-tenant database system). The cloud platform 115 (e.g., one or more database servers or server clusters) may host a "connected contact identification service." The connected contact identification service (or an associated service) may process communication messages, including messages transmitted between cloud clients 105 and/or contacts 110 and activities associated with cloud clients 105 and/or contacts 110, and may perform NLP, metadata extraction, or both on the communication messages or interaction data. The NLP and metadata extraction may identify activity data to be used for activity-based graph generation and upkeep. The connected contact identification service (or an associated service) may generate a graph, where the nodes of the graph represent users and targets (e.g., corresponding to cloud clients 105, contacts 110, or both) and the edges of the graph represent connections—and corresponding connection strengths—between the users and targets.

The connected contact identification service may utilize this graph to provide a user of a source organization with insights into which users of one or more target organizations have the strongest connections within and outside the target organization. The target may be either a cloud client 105 or a contact 110. The user may send a request message to the cloud platform 115 running the connected contact identification service where the request message indicates a target organization. The service may utilize the graph to identify one or more connected contacts within the target organization. In some cases, the connected contact identification service automatically processes the graph(s) to maintain a record of one or more connected contacts for various potential target organizations. The connected contacts (e.g., target contacts) may be based on past communications and/or activities between users (of the source organization) and various contacts at the target organization. The service may identify a set of potential target contacts, which may be ranked in descending order by connection metric, and may return information related to one or more of the connected targets.

In some cases, a user may refer to a professional social network service to view potential target contacts at a target organization. The user may utilize the professional social network to manually identify the number of connections associated with various potential target contacts. In some cases, systems may not have the ability to utilize digital communication or interaction data to automatically identify target contacts from a target organization. Further, systems may not have robust connection graphs, which track connections based on communication/interaction with users from internal and/or external organizations, that may be utilized to identify target contacts. Yet further, if a system does maintain a robust connection graph or similar system, the graph may be large, and the graph may be difficult to efficiently process to identify well connected users.

In contrast, the connected contact identification system of the cloud platform 115 described herein builds, maintains, and utilizes a robust connection graph based on interactions/communications between users of various organizations to identify connected contacts in target organizations. In some cases, the connected contact identification system utilizes communication and interaction data of a cloud client 105 for the connection graph, where nodes of the graph represent users of the cloud client 105 and/or targets of external organizations (e.g., a contact 110). For example, the connected contact identification system may not be able to directly access communication/interaction data of the external organization. However, communications and interactions between users of the external organization and the source organization (e.g., interactions 130) may be utilized to build the connection graph. Further, communications between users of the external organization that copy users of the cloud client 105 (e.g., indirect communication) may be utilized to build the connection graph. In some cases, the connected contact identification service may have direct access to the communication data of the target organization. Because the connected contact identification service maintains a robust connection graph, the service may identify those users of external organizations that are connected, internally and externally, such that the target users may identified and targeted for initializing a relationship (e.g., for sales). Further, the connected contact identification system breaks down the robust connection graph into multiple groups for processing and consideration of connected contacts. Breaking down the graph in the described manner allows the graph groups to be efficiently processed and allows for efficient identification of connected contacts. Furthermore, the service may remove some info maintained in the connection graph, which may be unneeded or may require significant processing for identifying connected contacts. As such, the service may utilize smaller groups (e.g., relative to the entire connection graph), condition the data for efficient processing, and perform the processing using the groups to identify connected contacts based on past interaction data.

It should be appreciated by a person skilled in the art that one or more aspects of the disclosure may be implemented in a system 100 to additionally or alternatively solve other problems than those described herein. Furthermore, aspects of the disclosure may provide technical improvements to "conventional" systems or processes as described herein. However, the description and appended drawings only include example technical improvements resulting from implementing aspects of the disclosure, and accordingly do not represent all of the technical improvements provided within the scope of the claims.

In an example utilization of the connected contact identification system of the cloud platform 115, a user, such as a salesperson at a cloud client 105 may want to initiate communication with an organization (e.g., a contact 110) to establish a relationship for sales purposes. The connected contact identification system may store and maintain a connection graph that includes contacts at the target organization based on past communication data (e.g., interactions 130) between the users of the cloud client 105 and the organization. Using the connection graph, the connected contact identification system may identify one or more contacts at the target organization that are highly connected (within and outside the organization) and may give the user the highest chance of a successful relationship.

Figure 2:
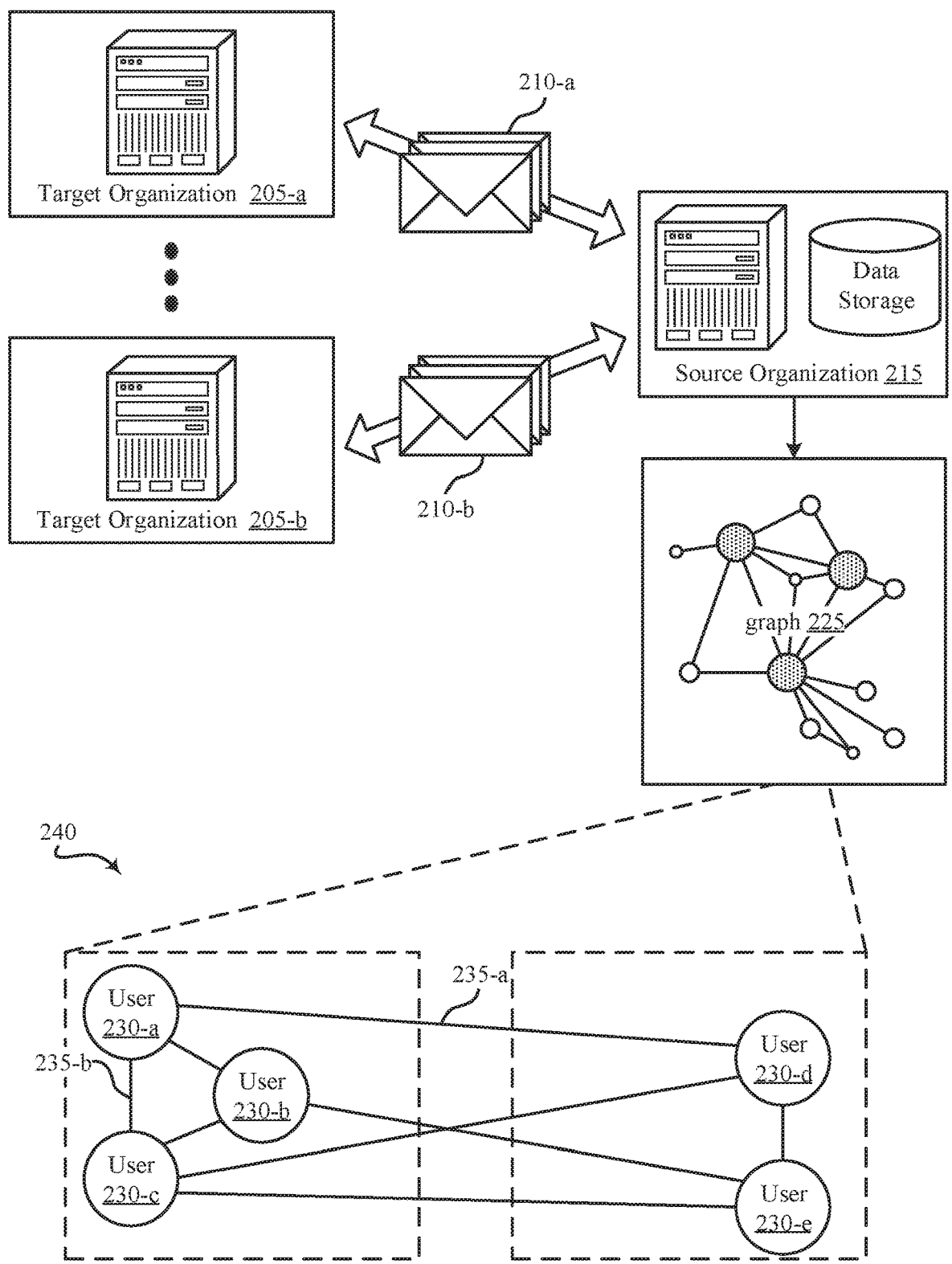
FIG. 2 illustrates an example of a system that supports connected contact identification in accordance with aspects of the present disclosure.

FIG. 2 illustrates an example of a system 200 that supports connected contact identification in accordance with aspects of the present disclosure. The system 200 includes a source organization 215, which may be an example of a cloud client 105 of FIG. 1. The system 200 illustrates various interactions 210 with various target organizations 205, which may be example of a contact 110 of FIG. 1. The interactions 210 may be examples of transmitted and received communication messages (e.g., emails, text messages), phone calls, meeting requests, social media posts, documents, etc. The source organization 215 may include or utilize various computing components such as data servers and/or data storage systems for facilitating and maintaining communications and supporting a connected contact identification service and other services. The source organization (e.g., using the cloud platform 115 of FIG. 1) builds, maintains, augments, and utilizes a graph 225 representing connections between various users. Each node of the graph 225 represents a user identifier associated with a user, and edges between the nodes represent connections between the user that are based on internal and external interactions (e.g., the interactions 210). The edges may be weighted based on various interaction factors such as interaction type, interaction recency, interaction frequency, etc. In some cases, the weighted edges are not computed until the groups are generated and processed. The connection graph contains the communication data that may be utilized to generate the weighted edges for the groups.

A graph subset 240 illustrates an example portion of the graph 225. The graph subset 240 includes various nodes 230 representing user identifiers associated with users. The graph subset 240 further includes edges 235 representing interactions between the users. Nodes 230-*d* and 230-*e* may represent users associated with the source organization 215, and the nodes 230-*a*, 230-*b*, and 230-*c* may represent users from a target organization (e.g., the target organization 205-*b*). An edge 235-*a* may represent an interaction (e.g., email, phone call, meeting request) between the node 230-*d* and the node 230-*a*, and the edge 235-*b* may represent an interaction between the node 230-*a* and the node 230-*c*. In some cases, the source organization 215 may not be able to detect interactions such as those represented by the edge 235-*b* (e.g., between users of an external organization). However, the interaction represented by the edge 235-*b* may reference or include a user represented by a node 230-*d* or 230-*e* associated with users of the source organization 215. Thus, the source organization 215 is able to identify the interaction and augment the graph 225 with such interaction information. In some cases, edges 235 may be associated with a directionality, which represents direction of communication. For example, the edge 235-*a* may have a direction from the node 230-*d* to the node 230-*a* based on direction of communication (e.g., the communication was transmitted by the user associated with 230-*d* to the user associated with the node 230-*a*). Accordingly, a pair of nodes may have two edges between the nodes.

A user associated with the source organization 215 utilizes the connected contact identification service to request a target contact of one of the target organizations 205. To identify the connected contact (e.g., target user identifier), the connected contact identification service generates one or more subsets (e.g., groups) of nodes associated with user identifiers from the graph 225. Each of the groups include a group of users that are connected within the graph 225. The subsets may include various users of the target organization 205 (and potentially user identifiers associated with other organizations). The groups may be limited such that each group does not include user identifiers (nodes) associated with the source organization 215. For example, the graph subset 240 may be used to generate a group including node 230-*a*, node 230-*b*, and node 230-*c*. In other words, the user identifiers associated with the source organization may be removed from the graph 225 to generate the groups. It should be understood that each of the groups may include other nodes from other organizations that are not illustrated in FIG. 2. Accordingly, by removing the identifiers associated with the source organization (e.g., source of the communication data used to generate the graph), the server effectively removes a "super node" of the graph leaving a plurality of interconnected groups. These interconnected groups contain information which is informative of which users are well connected within their groups. Thus, by removing the source organization identifiers, the remaining groups contain rich information for computing the target contacts. The servers may further remove groups (or not consider the groups for target contacts) that do not satisfy minimum group size and maximum group size thresholds. The system may further limit the number of algorithmic iterations through the graph to identify the different groups.

The connected contact identification service may generate weighted edges for the groups based on the communication data. The edges may be weighted based on interaction type, interaction frequency, etc. The service may weight each type of interaction differently. For example, meetings, direct emails, indirect emails, edge direction (e.g., which user transmitted the communication), etc. may be assigned different weights in determining the score. The service may further assign scores to each node (user identifier) within each group based on the weighted edges. In some cases, the service uses a page rank or reverse page rank process to determine the score, and the page rank or reverse page rank process may utilize the different weights to determine the scores. The page rank process may further be limited to a certain number of iterations. It should be understood that other methods of scoring the users may be employed.

After scores are assigned to nodes of the various groups of the graph 225, the service may identify a set of nodes that satisfy a connected target threshold. The threshold may vary based on the number of groups, number of nodes, etc. In some cases, the service may limit the number of target user identifiers identified per group. The users associated with the nodes that satisfy the threshold may be indicated as target contacts of the target organization 205. In some cases, the service may filter some target contacts from groups based on the target contacts not being scored above a threshold relative to other identifiers within a group. For example, the service identifies a particular identifier as having the highest connection score within a group, but the score is within one standard deviation from the mean, and thus, may not be considered for a target contact. As such, target contacts may be identified that are at least one standard deviation from the mean. In some cases, the service may indicate a human-readable rationale to the user. An example rationale states, "among a group of five people at WidgetCorp, Xi is particularly well-connected, having sent emails to four people and met with three people." This rationale may be generated based on the communication data of the connection graph.

In some cases, an organization may be an example of a tenant in a multi-tenant database system. Each tenant may have a tenant-specific graph indicating connections for users of that tenant. In some cases, these tenant-specific graphs may be independent, without sharing of any contact or connection information between tenants. In other cases, two or more tenants may share information across graphs in order to improve the available communication information. The tenants may not share intra-organization information or specific communication messages or metadata. Instead, the tenants may share contact information (e.g., email signature information) to improve edge density and granularity of the graphs for the tenants involved. Whether tenants share information, as well as what information is shared, may be based on a tenant information sharing policy, which may be configurable on a tenant-by-tenant basis. In some cases, the tenants may share connection information, node information, or some combination of these to expand the dataset for generating the graph 225.

The above processes may be applied to any or all types of communication messages and interactions 210. These may include emails, calendar events, text messages, phone calls, personal address books, social media chats or messages, documents, files (e.g., Quip files), marketing campaigns, web forms, or any manually logged information, such as emails, events, or activities. For example, a user may input, into the system 200, an indication of an activity that the user participated in with a target or user. These manually uploaded activities may be used along with automatically uploaded or stored information when calculating the connection metrics.

Not all communication messages 210 may be analyzed or scored. In some cases, the system 200 may implement a markoff process to sort through the communication messages 210 and identify the messages or activities with information relevant to the connections. The service may analyze the identified communication messages to calculate the connection metrics, and may not analyze the marked off communication messages.

The system 200 may include any number of the above parameters when generating or updating the graph 225. For example, the connected contact identification service may store an algorithm in memory. In some cases, the algorithm may be an example of a user, organization, or tenant configurable algorithm. The connected contact identification service may perform NLP on a set of communication messages 210 in order to extract metadata, and may use the extracted metadata as input to the algorithm. This extracted metadata may correspond to one or more of the above parameters, and based on the algorithm, the connected contact identification service may determine the connection strength value to indicate in the graph 225.

The connected contact identification service may allow users of an organization to view explicit values corresponding to implicitly established relationships between users and targets. The service efficiently utilizes messages and activities already stored in data stores to generate the graph 225, and may limit latency by continually updating the graph 225 based on communication message streams in pseudo-real-time.

Figure 3:
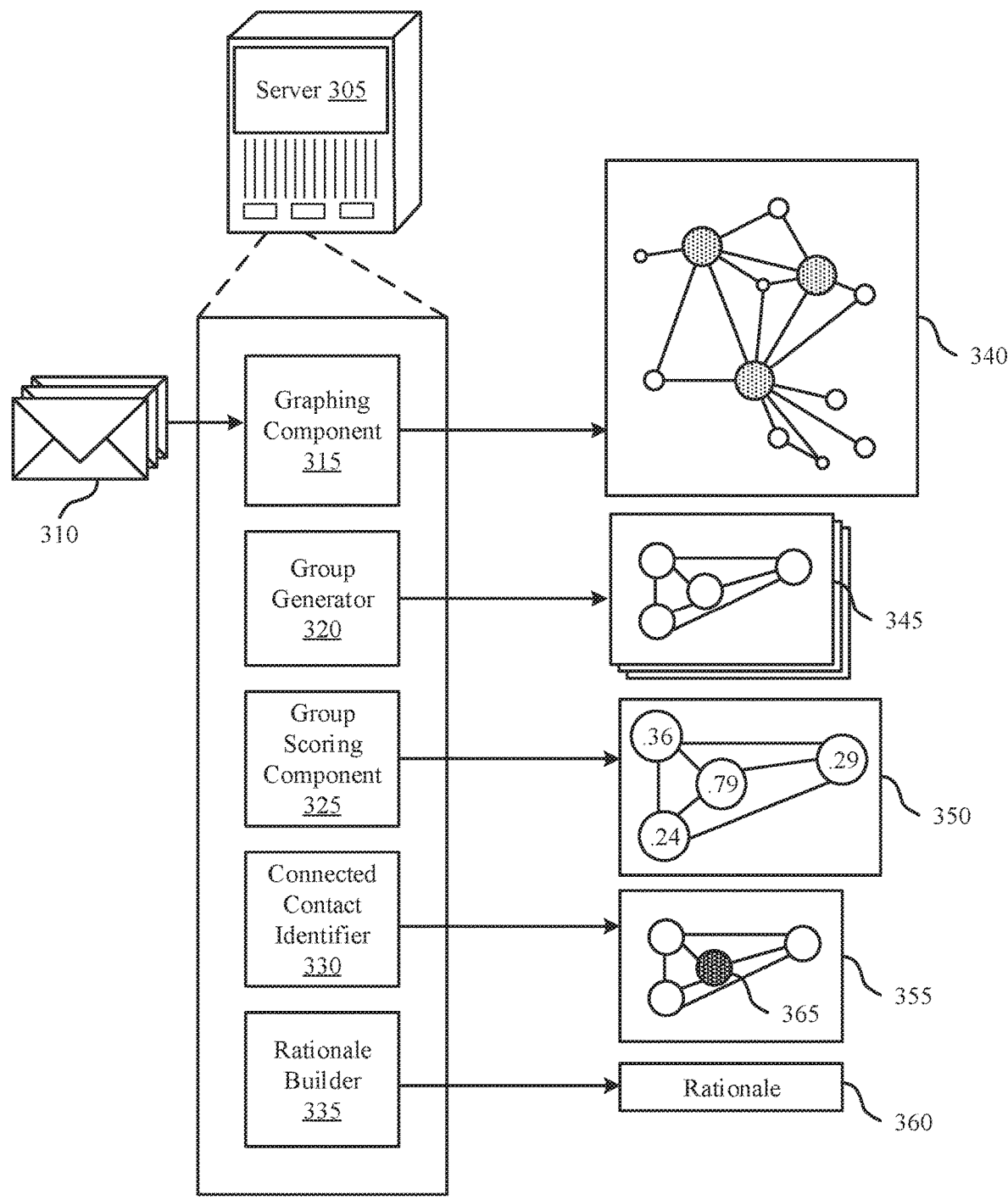
FIG. 3 illustrates an example of a system including a server that supports connected contact identification in accordance with aspects of the present disclosure.

FIG. 3 illustrates an example of a system 300 including a server 305 that supports connected contact identification in accordance with aspects of the present disclosure. The server 305, which may include various aspects of the system 200 described with respect to FIG. 2 and may be a database server 515 described in FIG. 5, includes various components that support a connected contact identification service. The server 305 includes a graphing component 315 that receives and stores various interactions 310 between users associated with at least a source organization and a target organization. The interactions 310 may include transmitted and received messages (e.g., emails), meeting requests, meetings, phone calls, social media messages or posts, etc. In some cases, the interactions 310 are automatically detected and analyzed, and in some cases, the user may input the interactions 310 via a user interface (UI). The graphing component 315 stores, accesses, maintains, updates, etc. a graph 340 representation of the various interactions 310. The graph 340 may be an example of a graph 225 as described with respect to FIG. 2.

A group generator 320 of the server 305 generates one or groups 345, which may comprise subsets of the graph 340. The group generator 320 may remove unneeded data from the graphs. In some cases, the group generator 320 generates the groups by removing user identifiers from the source organizations. The groups may be analyzed using iterative techniques to identify connected groups from the graph 340 that satisfy certain constraints, such as minimum group size, maximum group size, one source organization user identifier (node) per group, no source organization nodes per group, minimum number of interactions or events within a group, etc. For example, a group with too few interactions may not yield enough information to identify target contacts. Such a process effectively "thins" the graph 340 such that the groups may be efficiently analyzed within a "communication group" to calculate connection metrics and identify connected contacts.

For each group, a group scoring component 325 implements a process to calculate a connection metric for each user identifier within a group. The process may include parameterizing communication data into edges of the group. The process may include applying weights to different interaction types, interaction recency, frequency, etc. The group scoring component 325 may assign different weights to different types of interactions, direction of interaction, etc. For example, if a meeting is assigned a weight of 3, a direct email is assigned a weight to 5, and an indirect email is assigned a weight of 1 and an edge includes 1 meeting, 2 direct emails, and 3 indirect emails, then the edge has a total weight of 16 (3*1+5*2+1*3). Further, event weights may be time discounted to provide more importance to recent interactions. For example, the weights are applied based on a half-life function or exponential decay function, which applies higher weight to recent interactions and lower or no weight to interactions that occurred further in the past. The process may further apply a reverse page rank algorithm that utilizes the interaction data (which is parameterized in the edges of the groups) to calculate the connection metric. An edge direction parameter of the algorithm may determine whether the algorithm should evolve by sending probabilities in the direction of the edges or the opposite direction. A parameter may also define the probability of a uniform transition to a random vertex (node) in the graph 340. Another parameter may define the maximum number of iterations for the page rank algorithm. As illustrated in group 350, the group scoring component 325 assigns scores to each node in the group based on the interactions (e.g., edges). In some examples implementations, the connection metrics may be normalized to values between 0 and 1, where 1 represents a highly connected node and 0 represents no connection. Other parameters may define the maximum group size, minimum group size, minimum number of events per group, etc. It should be understood that other parameters may be utilized for different scoring algorithms.

A connected contact identifier 330 of the server 305 identifies user identifiers of various groups that satisfy target contact thresholds. For example, depending on the number of groups and average size of the groups, the connected contact identifier 330 may identify the top ten connected contacts (of external organizations) based on the connected metrics calculated by the group scoring component 325. In some cases, parameters define a maximum number of user identifiers (nodes) that may be selected per group. For example, for a large group, the connected contact identifier may not select a number relatively large number of user identifiers for target contacts, even if those nodes are scored higher than nodes of a smaller group. In some cases, the connected contact identifier 330 may consider standard deviations for each group when determining target contacts. For example, the highest scored contact within a group may not be selected as a target identifier because the score is less than one standard deviation from the mean. At 355, the connected contact identifier 330 identifies a node 365 as being a connected target contact for having the high score of the group (e.g., 0.79).

A rationale builder 335 of the server 305 builds a rationale 360 for one or more target contacts based on the data used to identify the contacts. The data may include number of connections, type of interactions, etc. The rationale may be generated such that the rationale is human readable. The rationale may be transmitted to a user device associated with the user that requests the target contact identification.

Figure 4:
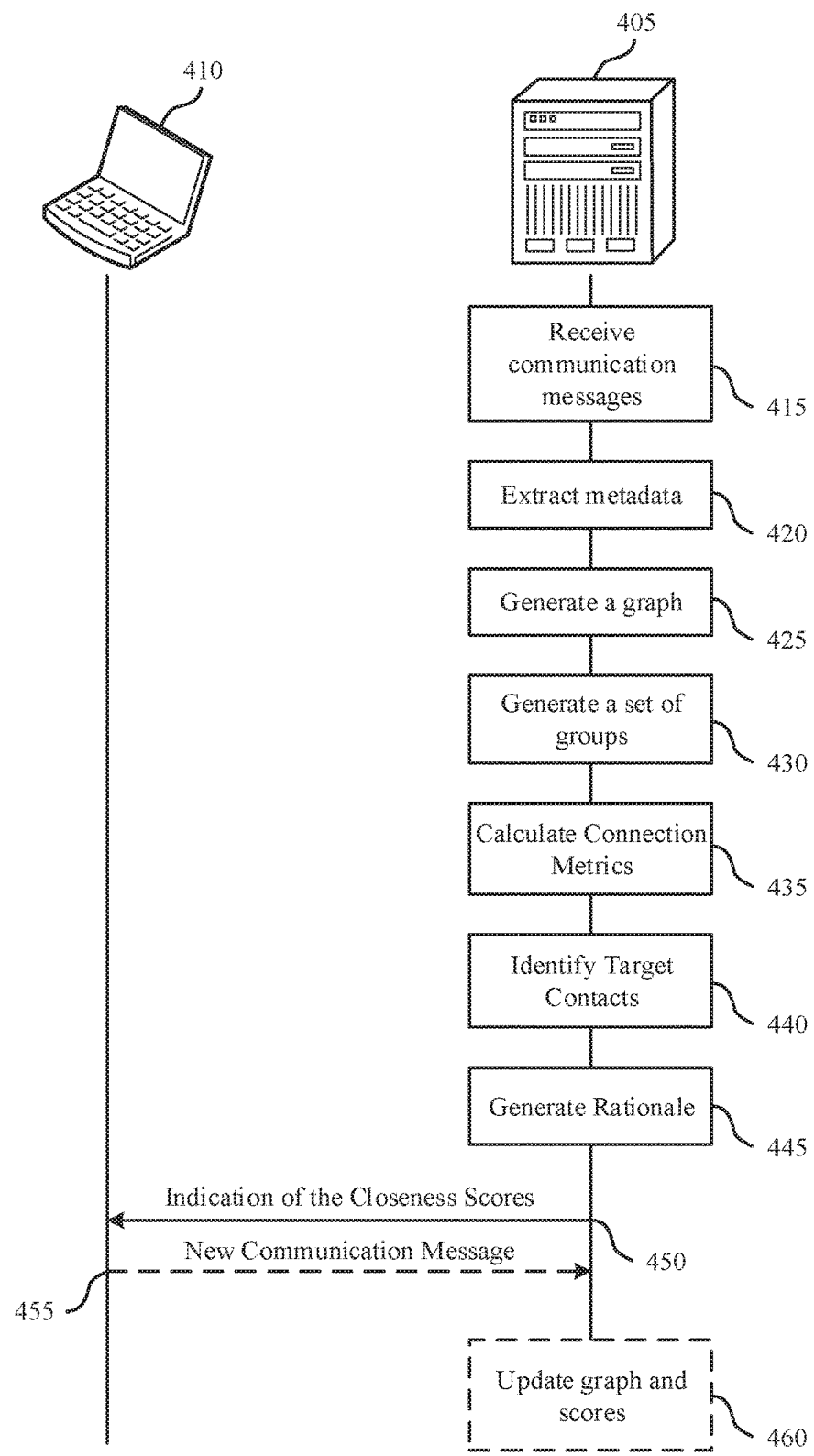
FIG. 4 illustrates an example of a process flow that supports connected contact identification in accordance with aspects of the present disclosure.

FIG. 4 illustrates an example of a process flow 400 that supports connected contact identification in accordance with aspects of the present disclosure. The process flow 400 may include a database server 405 and, in some cases, a user device 410. The database server 405 may be an example of an NLP server 305 as described with reference to FIG. 3, or may be a component of a cloud platform 115, data center 120, or system 200, as described with reference to FIGS. 1 and 2. The user device 410 may be an example of a cloud client 105. The database server 405 may process communication data to determine one or more connected target contacts of one or more target organizations for a user a source organization.

At 415, the database server 405 may receive communication messages associated with a first user identifier and a second user identifier. These communication messages may be examples of emails, calendar events, service tickets, text messages, voice calls, social media messages, documents, or any other messages associated with two or more users. In some cases, the communication messages may be activities or tasks performed by a first user identifier and associated with a second user identifier. A user device, such as the user device 410, may send the communication messages to the database server 405. For example, the user device 410 may correspond to a first user or first user identifier, and may transmit the communications to a second user or user identifier. The second user may be associated with the database server 405, and the database server 405 may receive the communication messages in addition to the second user based on the association. Alternatively, the first user may be associated with the database server 405, and may receive communications from a user device of the second user. The user device 410 of the first user may forward these communications to the database server 405 at 415. In other cases, the database server 405 may receive batches of communication messages from storage (e.g., stored in memory in a database or on a disk).

At 420, the database server 405 may extract metadata from the communication messages. For example, the database server 405 may perform NLP analysis on the text of the communication messages. For each communication message, the extracted metadata may include a timestamp associated with the message, user identifiers (e.g., the first user identifier, the second user identifier, or additional user identifiers) associated with the message, or businesses or organizations mentioned in the message. Additionally or alternatively, the database server 405 may use the NLP to determine an intent of the message, a formality level of the message, an influence level of one or more users associated with the message, or any other metrics or patterns for the message that may help define the relationship between the first user identifier and the second user identifier. The NLP procedure may include data parsing, validation, filtering, extraction, normalization, anonymization, sampling, labeling, word embedding, or any combination of these or other NLP techniques.

At 425, the database server 405 may generate a graph representation of one or more connections between the first user identifier and the second user identifier. The graph may additionally include many other user identifiers, along with connections for these user identifiers as well. In the graph representation, these connections may be represented by direct or indirect edges between users (e.g., where the users are represented by nodes). In some cases (e.g., in a multi-tenant database system), the database server 405 may store multiple tenant-specific graphs in memory. These tenant-specific graphs may or may not share connection information according to tenant information sharing policies. The graph representation may indicate an edge direction between users, a timestamp associated with messages, a sender or sender information associated with messages, a recipient or recipient information associated with messages, event types associated with messages, text associated with messages, or some combination of these or other indications.

Generating the graph may involve multiple techniques, including entity resolution, graph enhancement, or any combination of these or other graph generation techniques. Entity resolution may involve the database server 405 identifying any nodes that correspond to a same contact (e.g., if a user or target has multiple different email addresses), and merging these nodes to form a single node corresponding to the contact. Graph enhancement may involve the database server 405 performing one or more additional operations. These additional operations may include inferring whether a contact is within or outside of a user organization, identifying emails to avoid creating nodes for (e.g., based on a non-human email address, a suspicious name or email address, a shared email account, etc.), condensing user to user edge communication to reduce the size of the graph, or any combination of these or similar graph enhancement operations.

At 430, the database server 405 may generate a set of groups corresponding to subsets of the graph. Generating the set of groups may involve removing source identifiers from the graph to leave the groups. Generating may further involve iterating through the graph to identify subsets that are interconnected while accounting for constraints such as maximum group size, minimum group size, no source user identifiers per group, etc. In some cases when a generated group does not satisfy the maximum or minimum group size, the group may be removed from consideration for connected contact identification.

At 435, the database server 405 may calculate a connection metric for each of the user identifiers of each group. For example, the database server 405 may parameterize communication data into edges between the user identifiers of the groups. The parametrization may include applying weights based on communication data. The database server 405 may analyze connections and interaction factors, and determine the weighted values based on the analysis. The connection metrics may be based on interaction factors such as when a communication occurred, whether the communication message represents a calendar invite or an email, how many users are associated with the interaction, direction of communication, or any combination of these or other scoring criteria. To calculate specific connection metrics for the user identifiers, the database server 405 may apply a reverse page rank algorithm to each of the groups. The reverse page rank algorithm may utilize the weighted edges to determine the metrics.

At 440, the database server 405 may identify one or more user identifiers from the group as target user identifiers associated with a target organization based on the connection metrics. A threshold connection metric may be considered when identifying target contacts. Further, the identification may include consideration of certain thresholds (e.g., a limited amount of target contacts per group, standard deviation thresholds).

At 445, the database server 445 generates rationales corresponding to the identified target identifiers. The rationales may be generated using the data or analysis logs for the calculation of the connection metrics at 435. The generated rationales may be human readable such that a user may select from a set of target identifiers based on the rationales.

At 450, the database server transmits an indication of the identified target user identifiers and the rationales to the user device 410. In some cases, this transmission may be in response to a connected target identification message from the user device 410.

At 455, the database server 405 may receive a new communication message associated with the first and second user identifiers. The new communication message may be part of a realtime or pseudo-realtime communication stream. At 460, the database server 405 may extract metadata from the new communication message, analyze the new metadata, and update the graph based on the new information. Accordingly, the database server 405 may additionally update the connection metrics based on the analysis of the new communication or the updated graph. In some cases, the database server 405 may transmit an updated set of target user identifiers based on the realtime or pseudo-realtime updates.

Figure 5:
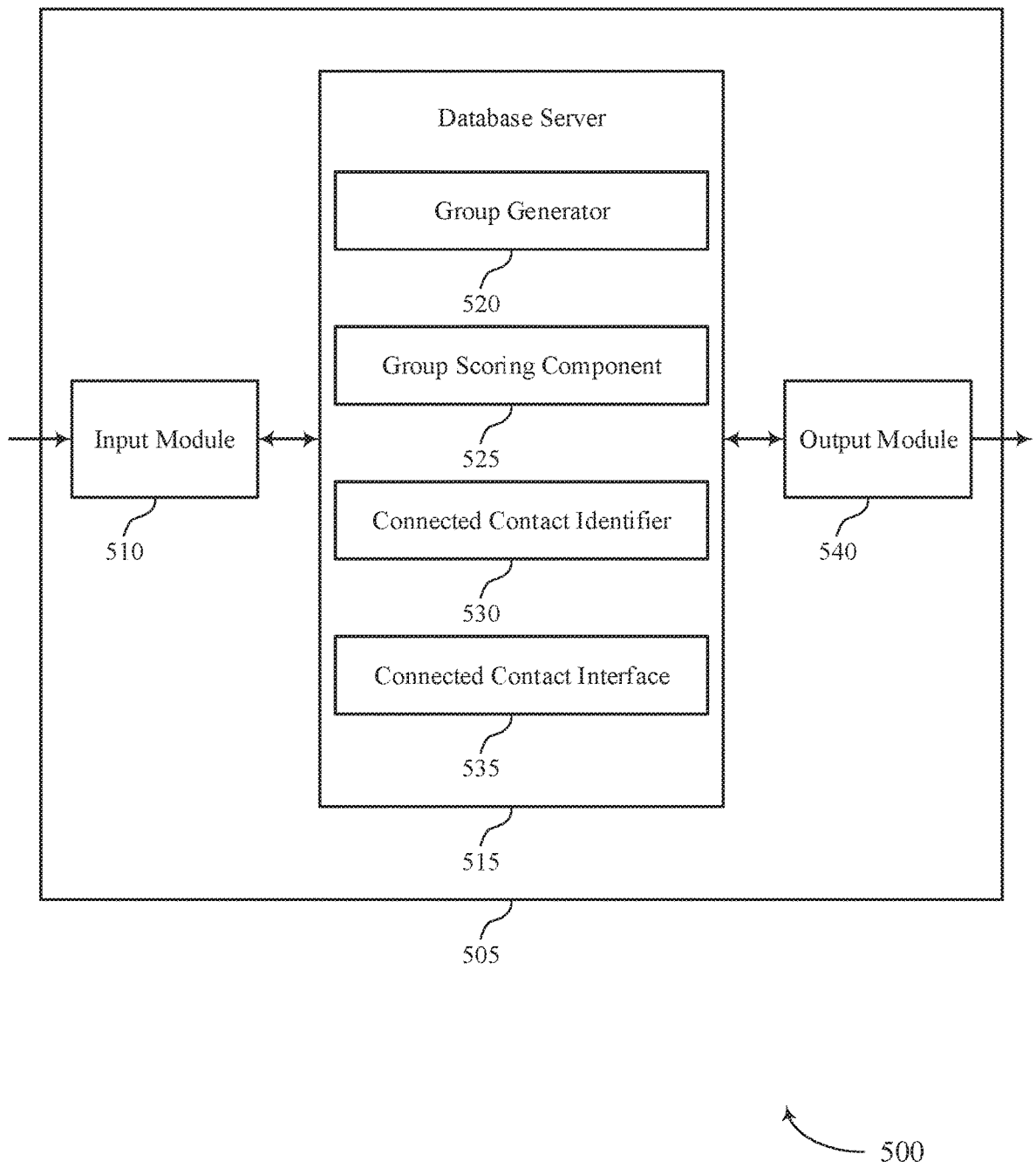
FIG. 5 shows a block diagram of an apparatus that supports connected contact identification in accordance with aspects of the present disclosure.

FIG. 5 shows a block diagram 500 of an apparatus 505 that supports connected contact identification in accordance with aspects of the present disclosure. The apparatus 505 may include an input module 510, a database server 515, and an output module 540. The apparatus 505 may also include a processor. Each of these components may be in communication with one another (e.g., via one or more buses). In some cases, the apparatus 505 may be an example of a user terminal, a database server, or a system containing multiple computing devices.

The input module 510 may manage input signals for the apparatus 505. For example, the input module 510 may identify input signals based on an interaction with a modem, a keyboard, a mouse, a touchscreen, or a similar device. These input signals may be associated with user input or processing at other components or devices. In some cases, the input module 610 may utilize an operating system such as iOS®, ANDROID®, MS-DOS®, MS-WINDOWS®, OS/2®, UNIX®, LINUX®, or another known operating system to handle input signals. The input module 510 may send aspects of these input signals to other components of the apparatus 505 for processing. For example, the input module 510 may transmit input signals to the database server 515 to support connected contact identification. In some cases, the input module 510 may be a component of an input/output (I/O) controller 715 as described with reference to FIG. 7.

The database server 515 may include a group generator 520, a group scoring component 525, a connected contact identifier 530, and a connected contact interface 535. The database server 515 may be an example of aspects of the database server 605 or 710 described with reference to FIGS. 6 and 7.

The database server 515 and/or at least some of its various sub-components may be implemented in hardware, software executed by a processor, firmware, or any combination thereof. If implemented in software executed by a processor, the functions of the database server 515 and/or at least some of its various sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure. The database server 515 and/or at least some of its various sub-components may be physically located at various positions, including being distributed such that portions of functions are implemented at different physical locations by one or more physical devices. In some examples, the database server 515 and/or at least some of its various sub-components may be a separate and distinct component in accordance with various aspects of the present disclosure. In other examples, the database server 515 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

The group generator 520 may generate, by the data server, one or more groups of user identifiers from a distributed graph representation of connections between a set of user identifiers, each of the set of user identifiers associated with at least one of a source organization and a target organization, the distributed graph representation of connections being stored at the data server and generated by the data server based on digital communications between user devices associated with the set of user identifiers.

The group scoring component 525 may identify, for each of the one or more groups, a connection metric corresponding to each of the user identifiers associated with the target organization, the identified connection metrics based on one or more interaction factors associated with interactions between the set of user identifiers, the one or more interaction factors generated by the data server based on the digital communications detected between user devices associated with the set of user identifiers.

The connected contact identifier 530 may identify one or more user identifiers associated with the target organization from the one or more groups of user identifiers as one or more target identifiers, the identifying based on the connection metrics assigned to each of the user identifiers associated with the target organization.

The connected contact interface 535 may transmit a digital communication message including an indication of the one or more target identifiers to a user device associated with the source organization.

The output module 540 may manage output signals for the apparatus 505. For example, the output module 540 may receive signals from other components of the apparatus 505, such as the database server 515, and may transmit these signals to other components or devices. In some specific examples, the output module 540 may transmit output signals for display in a user interface, for storage in a database or data store, for further processing at a server or server cluster, or for any other processes at any number of devices or systems. In some cases, the output module 540 may be a component of an I/O controller 715 as described with reference to FIG. 7.

Figure 6:
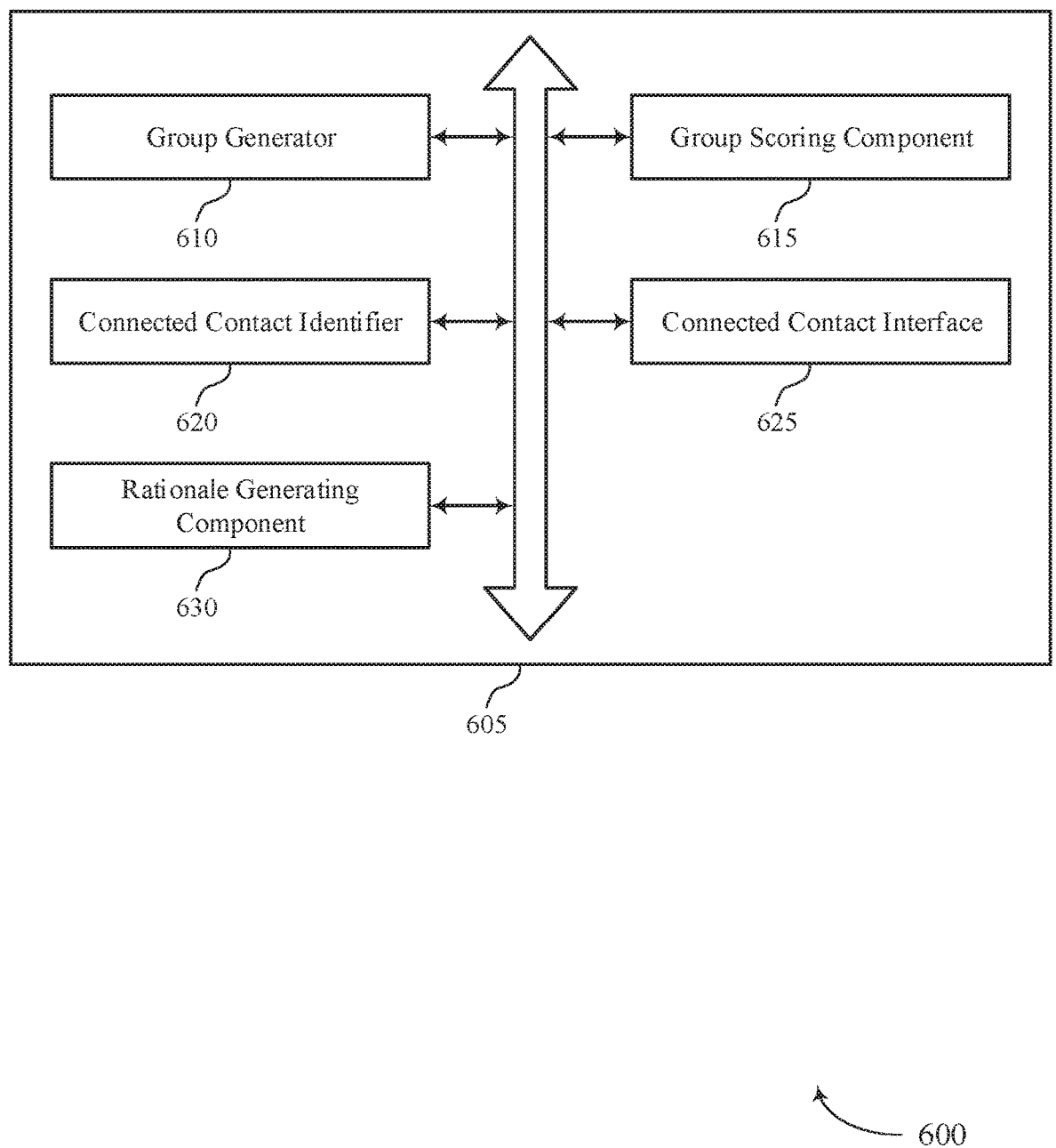
FIG. 6 shows a block diagram of a database server that supports connected contact identification in accordance with aspects of the present disclosure.

FIG. 6 shows a block diagram 600 of a database server 605 that supports connected contact identification in accordance with aspects of the present disclosure. The database server 605 may be an example of aspects of a database server 515 or a database server 710 described herein. The database server 605 may include a group generator 610, a group scoring component 615, a connected contact identifier 620, a connected contact interface 625, and a rationale generating component 630. Each of these modules may communicate, directly or indirectly, with one another (e.g., via one or more buses).

The group generator 610 may generate, by the data server, one or more groups of user identifiers from a distributed graph representation of connections between a set of user identifiers, each of the set of user identifiers associated with at least one of a source organization and a target organization, the distributed graph representation of connections being stored at the data server and generated by the data server based on digital communications between user devices associated with the set of user identifiers. In some examples, the group generator 610 may remove user identifiers associated with the source organization from the distributed graph representation of connections to generate the one or more groups. In some examples, the group generator 610 may determine whether the one or more groups of user identifiers generated from the distributed graph representation satisfy one or more constraints. In some examples, the group generator 610 may adjust the one or more groups of user identifiers based on the determining. In some examples, the group generator 610 may remove a group that does not satisfy the minimum group size. In some examples, the group generator 610 may remove a group that does not satisfy the maximum group size.

The group scoring component 615 may identify, for each of the one or more groups, a connection metric corresponding to each of the user identifiers associated with the target organization, the identified connection metrics based on one or more interaction factors associated with interactions between the set of user identifiers, the one or more interaction factors generated by the data server based on the digital communications detected between user devices associated with the set of user identifiers. In some examples, the group scoring component 615 may generate edges between one or more of the user identifiers of each of the one or more groups of user identifiers, the edges generated based on the interactions between the user identifiers of each of the groups. In some examples, the group scoring component 615 may apply weights to the edges based on an interaction type of the interactions, a timing of the interaction, or a combination thereof. In some examples, the group scoring component 615 may apply the weights to the edges further based on recency of communication, frequency of communication, or a combination thereof. In some examples, the group scoring component 615 may apply a reverse page rank algorithm to each of the one or more groups to generate the connection metric, the reverse page rank algorithm generating the connection metrics using at least the weighted edges. In some cases, the type of the interactions includes direct email, indirect email, meeting, or a combination thereof. In some cases, the interaction factors include recency of communication, frequency of communication, type of interaction, timing of interaction, or a combination thereof.

The connected contact identifier 620 may identify one or more user identifiers associated with the target organization from the one or more groups of user identifiers as one or more target identifiers, the identifying based on the connection metrics assigned to each of the user identifiers associated with the target organization. In some examples, the connected contact identifier 620 may identify at least one user identifier from each of the one or more groups as a target identifier. In some cases, the target identifiers are identified based on the connection metric associated with the target identifier satisfying a target identifier threshold.

The connected contact interface 625 may transmit a digital communication message including an indication of the one or more target identifiers to a user device associated with the source organization. In some cases, the transmitted digital communication message further includes the generated rationale.

The rationale generating component 630 may generate a rationale associated with the one or more target identifiers, the rationale including an indication of one or more of the connection metrics associated with each of the one or more target identifiers.

Figure 7:
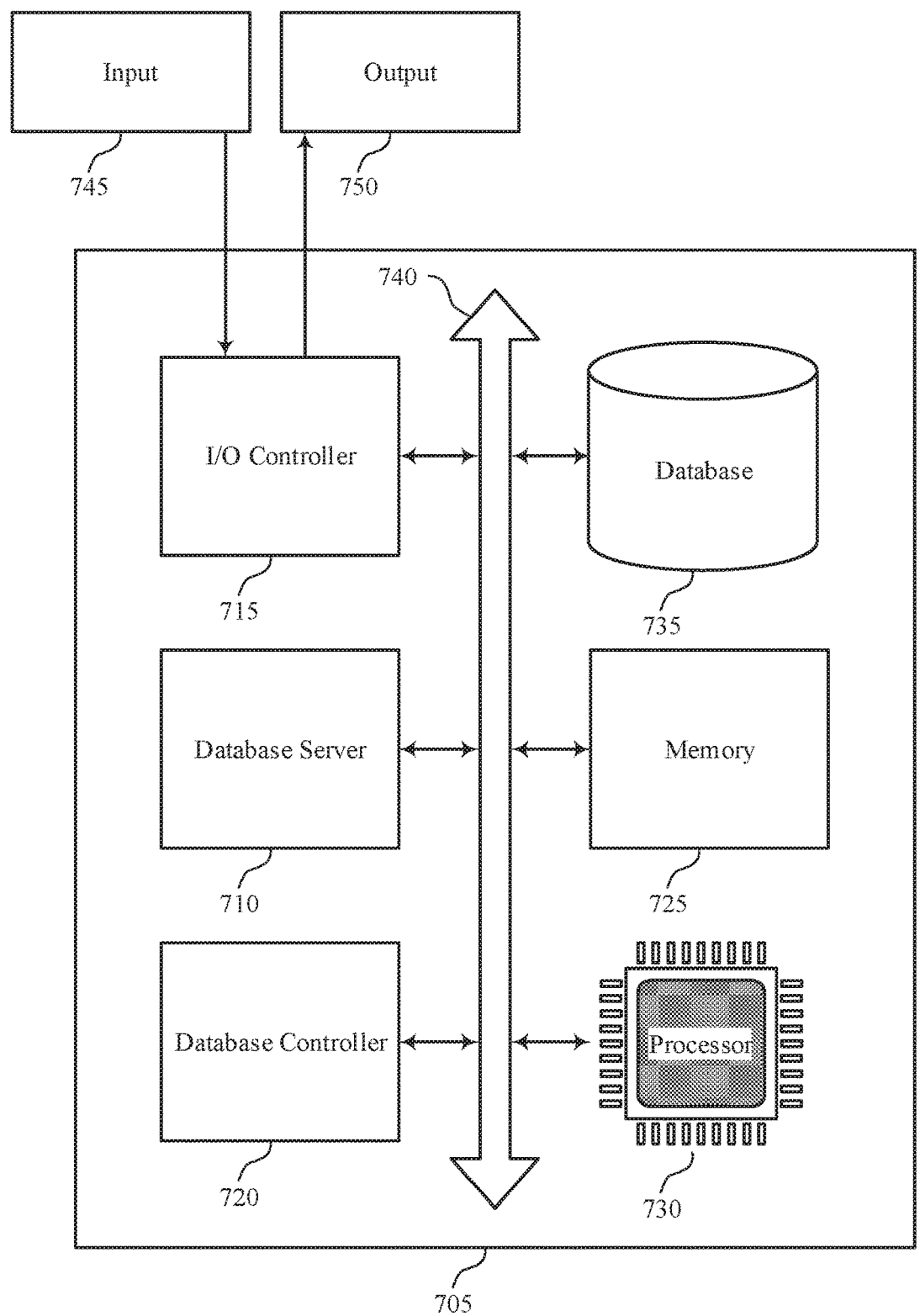
FIG. 7 shows a diagram of a system including a device that supports connected contact identification in accordance with aspects of the present disclosure.

FIG. 7 shows a diagram of a system 700 including a device 705 that supports connected contact identification in accordance with aspects of the present disclosure. The device 705 may be an example of or include the components of a database server or an apparatus 505 as described herein. The device 705 may include components for bi-directional data communications including components for transmitting and receiving communications, including a database server 710, an I/O controller 715, a database controller 720, memory 725, a processor 730, and a database 735. These components may be in electronic communication via one or more buses (e.g., bus 740).

The database server 710 may be an example of a database server 515 or 605 as described herein. For example, the database server 710 may perform any of the methods or processes described herein with reference to FIGS. 5 and 6. In some cases, the database server 710 may be implemented in hardware, software executed by a processor, firmware, or any combination thereof.

The I/O controller 715 may manage input signals 745 and output signals 750 for the device 705. The I/O controller 715 may also manage peripherals not integrated into the device 705. In some cases, the I/O controller 715 may represent a physical connection or port to an external peripheral. In some cases, the I/O controller 715 may utilize an operating system such as iOS®, ANDROID®, MS-DOS®, MS-WINDOWS®, OS/2®, UNIX®, LINUX®, or another known operating system. In other cases, the I/O controller 715 may represent or interact with a modem, a keyboard, a mouse, a touchscreen, or a similar device. In some cases, the I/O controller 715 may be implemented as part of a processor. In some cases, a user may interact with the device 705 via the I/O controller 715 or via hardware components controlled by the I/O controller 715.

The database controller 720 may manage data storage and processing in a database 735. In some cases, a user may interact with the database controller 720. In other cases, the database controller 720 may operate automatically without user interaction. The database 735 may be an example of a single database, a distributed database, multiple distributed databases, a data store, a data lake, or an emergency backup database.

Memory 725 may include random-access memory (RAM) and read-only memory (ROM). The memory 725 may store computer-readable, computer-executable software including instructions that, when executed, cause the processor to perform various functions described herein. In some cases, the memory 725 may contain, among other things, a basic input/output system (BIOS) which may control basic hardware or software operation such as the interaction with peripheral components or devices.

The processor 730 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, the processor 730 may be configured to operate a memory array using a memory controller. In other cases, a memory controller may be integrated into the processor 730. The processor 730 may be configured to execute computer-readable instructions stored in a memory 725 to perform various functions (e.g., functions or tasks supporting connected contact identification).

Figure 8:
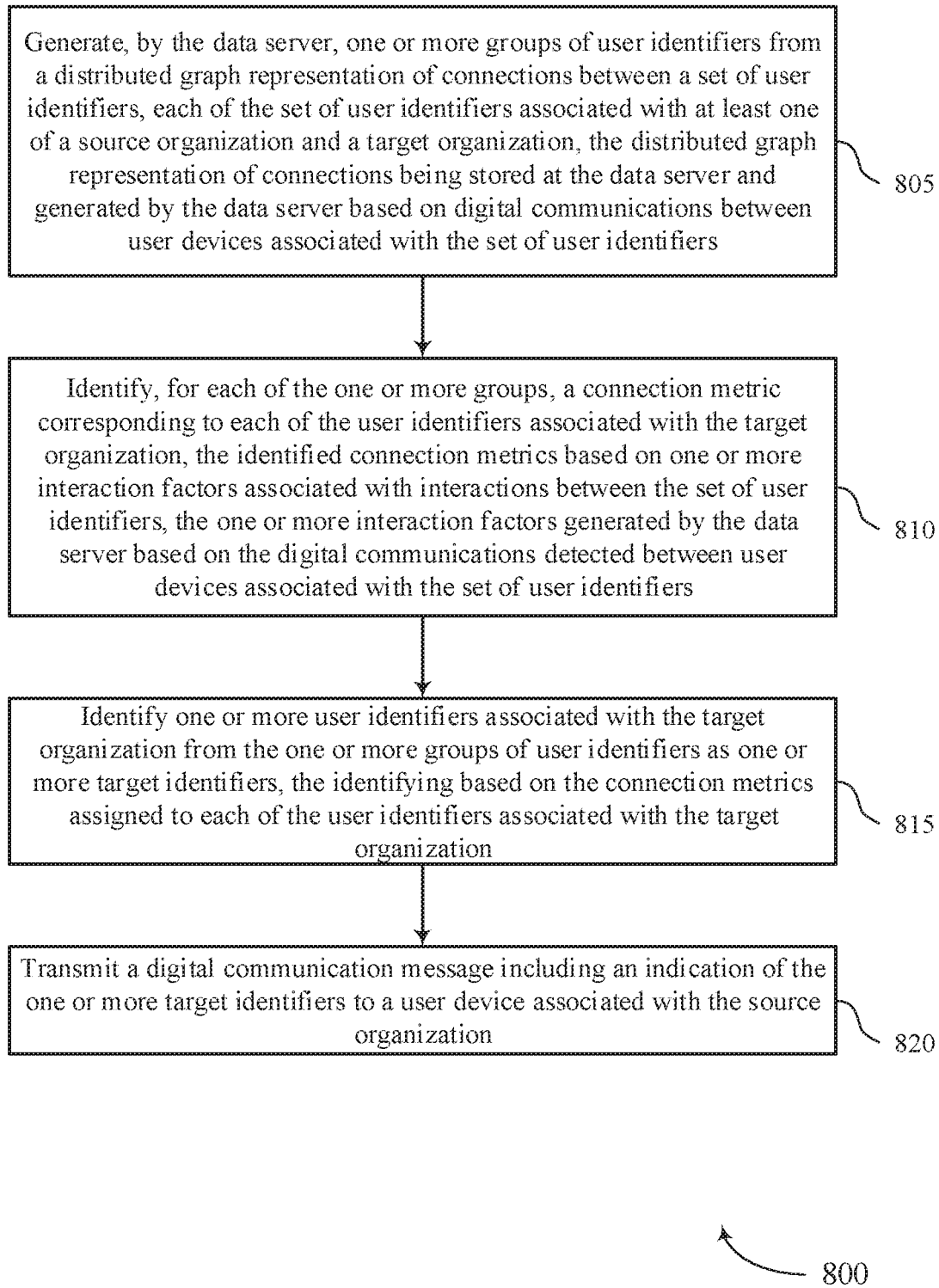
FIGS. 8 through 10 show flowcharts illustrating methods that support connected contact identification in accordance with aspects of the present disclosure.

FIG. 8 shows a flowchart illustrating a method 800 that supports connected contact identification in accordance with aspects of the present disclosure. The operations of method 800 may be implemented by a database server or its components as described herein. For example, the operations of method 800 may be performed by a database server as described with reference to FIGS. 5 through 7. In some examples, a database server may execute a set of instructions to control the functional elements of the database server to perform the functions described herein. Additionally or alternatively, a database server may perform aspects of the functions described herein using special-purpose hardware.

At 805, the database server may generate, by the data server, one or more groups of user identifiers from a distributed graph representation of connections between a set of user identifiers, each of the set of user identifiers associated with at least one of a source organization and a target organization, the distributed graph representation of connections being stored at the data server and generated by the data server based on digital communications between user devices associated with the set of user identifiers. The operations of 805 may be performed according to the methods described herein. In some examples, aspects of the operations of 805 may be performed by a group generator as described with reference to FIGS. 5 through 7.

At 810, the database server may identify, for each of the one or more groups, a connection metric corresponding to each of the user identifiers associated with the target organization, the identified connection metrics based on one or more interaction factors associated with interactions between the set of user identifiers, the one or more interaction factors generated by the data server based on the digital communications detected between user devices associated with the set of user identifiers. The operations of 810 may be performed according to the methods described herein. In some examples, aspects of the operations of 810 may be performed by a group scoring component as described with reference to FIGS. 5 through 7.

At 815, the database server may identify one or more user identifiers associated with the target organization from the one or more groups of user identifiers as one or more target identifiers, the identifying based on the connection metrics assigned to each of the user identifiers associated with the target organization. The operations of 815 may be performed according to the methods described herein. In some examples, aspects of the operations of 815 may be performed by a connected contact identifier as described with reference to FIGS. 5 through 7.

At 820, the database server may transmit a digital communication message including an indication of the one or more target identifiers to a user device associated with the source organization. The operations of 820 may be performed according to the methods described herein. In some examples, aspects of the operations of 820 may be performed by a connected contact interface as described with reference to FIGS. 5 through 7.

Figure 9:
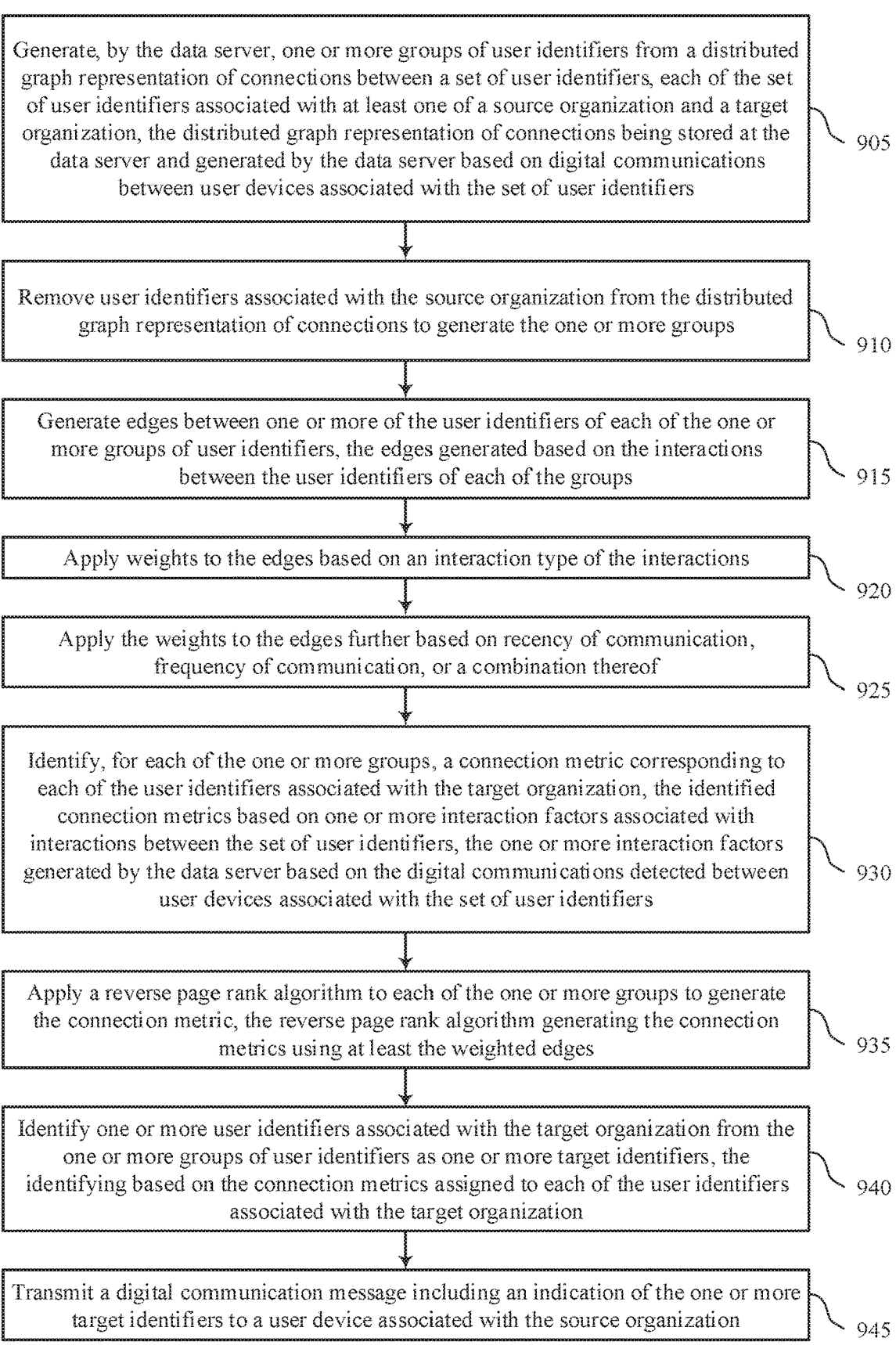

FIG. 9 shows a flowchart illustrating a method 900 that supports connected contact identification in accordance with aspects of the present disclosure. The operations of method 900 may be implemented by a database server or its components as described herein. For example, the operations of method 900 may be performed by a database server as described with reference to FIGS. 5 through 7. In some examples, a database server may execute a set of instructions to control the functional elements of the database server to perform the functions described herein. Additionally or alternatively, a database server may perform aspects of the functions described herein using special-purpose hardware.

At 905, the database server may generate, by the data server, one or more groups of user identifiers from a distributed graph representation of connections between a set of user identifiers, each of the set of user identifiers associated with at least one of a source organization and a target organization, the distributed graph representation of connections being stored at the data server and generated by the data server based on digital communications between user devices associated with the set of user identifiers. The operations of 905 may be performed according to the methods described herein. In some examples, aspects of the operations of 905 may be performed by a group generator as described with reference to FIGS. 5 through 7.

At 910, the database server may remove user identifiers associated with the source organization from the distributed graph representation of connections to generate the one or more groups. The operations of 910 may be performed according to the methods described herein. In some examples, aspects of the operations of 910 may be performed by a group generator as described with reference to FIGS. 5 through 7.

At 915, the database server may generate edges between one or more of the user identifiers of each of the one or more groups of user identifiers, the edges generated based on the interactions between the user identifiers of each of the groups. The operations of 915 may be performed according to the methods described herein. In some examples, aspects of the operations of 915 may be performed by a group scoring component as described with reference to FIGS. 5 through 7.

At 920, the database server may apply weights to the edges based on an interaction type of the interactions, timing of the interaction, or a combination thereof. The operations of 920 may be performed according to the methods described herein. In some examples, aspects of the operations of 920 may be performed by a group scoring component as described with reference to FIGS. 5 through 7.

At 925, the database server may apply the weights to the edges further based on recency of communication, frequency of communication, or a combination thereof. The operations of 925 may be performed according to the methods described herein. In some examples, aspects of the operations of 925 may be performed by a group scoring component as described with reference to FIGS. 5 through 7.

At 930, the database server may identify, for each of the one or more groups, a connection metric corresponding to each of the user identifiers associated with the target organization, the identified connection metrics based on one or more interaction factors associated with interactions between the set of user identifiers, the one or more interaction factors generated by the data server based on the digital communications detected between user devices associated with the set of user identifiers. The operations of 930 may be performed according to the methods described herein. In some examples, aspects of the operations of 930 may be performed by a group scoring component as described with reference to FIGS. 5 through 7.

At 935, the database server may apply a reverse page rank algorithm to each of the one or more groups to generate the connection metric, the reverse page rank algorithm generating the connection metrics using at least the weighted edges. The operations of 935 may be performed according to the methods described herein. In some examples, aspects of the operations of 935 may be performed by a group scoring component as described with reference to FIGS. 5 through 7.

At 940, the database server may identify one or more user identifiers associated with the target organization from the one or more groups of user identifiers as one or more target identifiers, the identifying based on the connection metrics assigned to each of the user identifiers associated with the target organization. The operations of 940 may be performed according to the methods described herein. In some examples, aspects of the operations of 940 may be performed by a connected contact identifier as described with reference to FIGS. 5 through 7.

At 945, the database server may transmit a digital communication message including an indication of the one or more target identifiers to a user device associated with the source organization. The operations of 945 may be performed according to the methods described herein. In some examples, aspects of the operations of 945 may be performed by a connected contact interface as described with reference to FIGS. 5 through 7.

Figure 10:
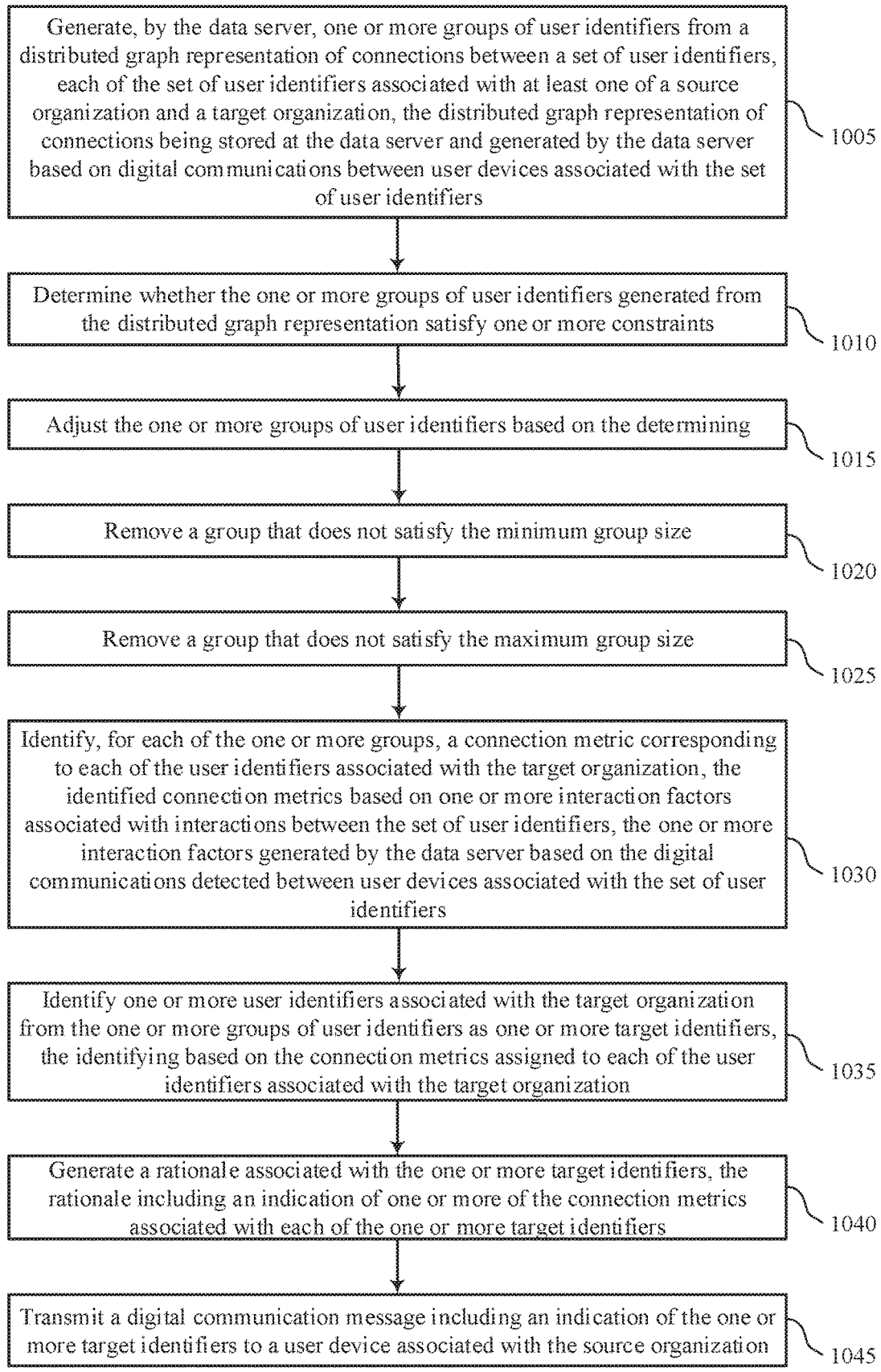

FIG. 10 shows a flowchart illustrating a method 1000 that supports connected contact identification in accordance with aspects of the present disclosure. The operations of method 1000 may be implemented by a database server or its components as described herein. For example, the operations of method 1000 may be performed by a database server as described with reference to FIGS. 5 through 7. In some examples, a database server may execute a set of instructions to control the functional elements of the database server to perform the functions described herein. Additionally or alternatively, a database server may perform aspects of the functions described herein using special-purpose hardware.

At 1005, the database server may generate, by the data server, one or more groups of user identifiers from a distributed graph representation of connections between a set of user identifiers, each of the set of user identifiers associated with at least one of a source organization and a target organization, the distributed graph representation of connections being stored at the data server and generated by the data server based on digital communications between user devices associated with the set of user identifiers. The operations of 1005 may be performed according to the methods described herein. In some examples, aspects of the operations of 1005 may be performed by a group generator as described with reference to FIGS. 5 through 7.

At 1010, the database server may determine whether the one or more groups of user identifiers generated from the distributed graph representation satisfy one or more constraints. The operations of 1010 may be performed according to the methods described herein. In some examples, aspects of the operations of 1010 may be performed by a group generator as described with reference to FIGS. 5 through 7.

At 1015, the database server may adjust the one or more groups of user identifiers based on the determining. The operations of 1015 may be performed according to the methods described herein. In some examples, aspects of the operations of 1015 may be performed by a group generator as described with reference to FIGS. 5 through 7.

At 1020, the database server may remove a group that does not satisfy the minimum group size. The operations of 1020 may be performed according to the methods described herein. In some examples, aspects of the operations of 1020 may be performed by a group generator as described with reference to FIGS. 5 through 7.

At 1025, the database server may remove a group that does not satisfy the maximum group size. The operations of 1025 may be performed according to the methods described herein. In some examples, aspects of the operations of 1025 may be performed by a group generator as described with reference to FIGS. 5 through 7.

At 1030, the database server may identify, for each of the one or more groups, a connection metric corresponding to each of the user identifiers associated with the target organization, the identified connection metrics based on one or more interaction factors associated with interactions between the set of user identifiers, the one or more interaction factors generated by the data server based on the digital communications detected between user devices associated with the set of user identifiers. The operations of 1030 may be performed according to the methods described herein. In some examples, aspects of the operations of 1030 may be performed by a group scoring component as described with reference to FIGS. 5 through 7.

At 1035, the database server may identify one or more user identifiers associated with the target organization from the one or more groups of user identifiers as one or more target identifiers, the identifying based on the connection metrics assigned to each of the user identifiers associated with the target organization. The operations of 1035 may be performed according to the methods described herein. In some examples, aspects of the operations of 1035 may be performed by a connected contact identifier as described with reference to FIGS. 5 through 7.

At 1040, the database server may generate a rationale associated with the one or more target identifiers, the rationale including an indication of one or more of the connection metrics associated with each of the one or more target identifiers. The operations of 1040 may be performed according to the methods described herein. In some examples, aspects of the operations of 1040 may be performed by a rationale generating component as described with reference to FIGS. 5 through 7.

At 1045, the database server may transmit a digital communication message including an indication of the one or more target identifiers to a user device associated with the source organization. The operations of 1045 may be performed according to the methods described herein. In some examples, aspects of the operations of 1045 may be performed by a connected contact interface as described with reference to FIGS. 5 through 7.

A method of data processing at a data server is described. The method may include generating, by the data server, one or more groups of user identifiers from a distributed graph representation of connections between a set of user identifiers, each of the set of user identifiers associated with at least one of a source organization and a target organization, the distributed graph representation of connections being stored at the data server and generated by the data server based on digital communications between user devices associated with the set of user identifiers, identifying, for each of the one or more groups, a connection metric corresponding to each of the user identifiers associated with the target organization, the identified connection metrics based on one or more interaction factors associated with interactions between the set of user identifiers, the one or more interaction factors generated by the data server based on the digital communications detected between user devices associated with the set of user identifiers, identifying one or more user identifiers associated with the target organization from the one or more groups of user identifiers as one or more target identifiers, the identifying based on the connection metrics assigned to each of the user identifiers associated with the target organization, and transmitting a digital communication message including an indication of the one or more target identifiers to a user device associated with the source organization.

An apparatus for data processing at a data server is described. The apparatus may include a processor, memory in electronic communication with the processor, and instructions stored in the memory. The instructions may be executable by the processor to cause the apparatus to generate, by the data server, one or more groups of user identifiers from a distributed graph representation of connections between a set of user identifiers, each of the set of user identifiers associated with at least one of a source organization and a target organization, the distributed graph representation of connections being stored at the data server and generated by the data server based on digital communications between user devices associated with the set of user identifiers, identify, for each of the one or more groups, a connection metric corresponding to each of the user identifiers associated with the target organization, the identified connection metrics based on one or more interaction factors associated with interactions between the set of user identifiers, the one or more interaction factors generated by the data server based on the digital communications detected between user devices associated with the set of user identifiers, identify one or more user identifiers associated with the target organization from the one or more groups of user identifiers as one or more target identifiers, the identifying based on the connection metrics assigned to each of the user identifiers associated with the target organization, and transmit a digital communication message including an indication of the one or more target identifiers to a user device associated with the source organization.

Another apparatus for data processing at a data server is described. The apparatus may include means for generating, by the data server, one or more groups of user identifiers from a distributed graph representation of connections between a set of user identifiers, each of the set of user identifiers associated with at least one of a source organization and a target organization, the distributed graph representation of connections being stored at the data server and generated by the data server based on digital communications between user devices associated with the set of user identifiers, identifying, for each of the one or more groups, a connection metric corresponding to each of the user identifiers associated with the target organization, the identified connection metrics based on one or more interaction factors associated with interactions between the set of user identifiers, the one or more interaction factors generated by the data server based on the digital communications detected between user devices associated with the set of user identifiers, identifying one or more user identifiers associated with the target organization from the one or more groups of user identifiers as one or more target identifiers, the identifying based on the connection metrics assigned to each of the user identifiers associated with the target organization, and transmitting a digital communication message including an indication of the one or more target identifiers to a user device associated with the source organization.

A non-transitory computer-readable medium storing code for data processing at a data server is described. The code may include instructions executable by a processor to generate, by the data server, one or more groups of user identifiers from a distributed graph representation of connections between a set of user identifiers, each of the set of user identifiers associated with at least one of a source organization and a target organization, the distributed graph representation of connections being stored at the data server and generated by the data server based on digital communications between user devices associated with the set of user identifiers, identify, for each of the one or more groups, a connection metric corresponding to each of the user identifiers associated with the target organization, the identified connection metrics based on one or more interaction factors associated with interactions between the set of user identifiers, the one or more interaction factors generated by the data server based on the digital communications detected between user devices associated with the set of user identifiers, identify one or more user identifiers associated with the target organization from the one or more groups of user identifiers as one or more target identifiers, the identifying based on the connection metrics assigned to each of the user identifiers associated with the target organization, and transmit a digital communication message including an indication of the one or more target identifiers to a user device associated with the source organization.

Some examples of the method, apparatuses, and non-transitory computer-readable medium described herein may further include operations, features, means, or instructions for removing user identifiers associated with the source organization from the distributed graph representation of connections to generate the one or more groups.

Some examples of the method, apparatuses, and non-transitory computer-readable medium described herein may further include operations, features, means, or instructions for generating edges between one or more of the user identifiers of each of the one or more groups of user identifiers, the edges generated based on the interactions between the user identifiers of each of the groups, and applying weights to the edges based on an interaction type of the interactions, timing of the interactions, or a combination thereof.

In some examples of the method, apparatuses, and non-transitory computer-readable medium described herein, the type of the interactions includes direct email, indirect email, meeting, or a combination thereof.

Some examples of the method, apparatuses, and non-transitory computer-readable medium described herein may further include operations, features, means, or instructions for applying the weights to the edges further based on recency of communication, frequency of communication, or a combination thereof.

Some examples of the method, apparatuses, and non-transitory computer-readable medium described herein may further include operations, features, means, or instructions for applying a reverse page rank algorithm to each of the one or more groups to generate the connection metric, the reverse page rank algorithm generating the connection metrics using at least the weighted edges.

Some examples of the method, apparatuses, and non-transitory computer-readable medium described herein may further include operations, features, means, or instructions for generating a rationale associated with the one or more target identifiers, the rationale including an indication of one or more of the connection metrics associated with each of the one or more target identifiers.

In some examples of the method, apparatuses, and non-transitory computer-readable medium described herein, the transmitted digital communication message further includes the generated rationale.

In some examples of the method, apparatuses, and non-transitory computer-readable medium described herein, the interaction factors include recency of communication, frequency of communication, type of interaction, or a combination thereof.

Some examples of the method, apparatuses, and non-transitory computer-readable medium described herein may further include operations, features, means, or instructions for determining whether the one or more groups of user identifiers generated from the distributed graph representation satisfy one or more constraints, and adjusting the one or more groups of user identifiers based on the determining.

In some examples of the method, apparatuses, and non-transitory computer-readable medium described herein, the one or more constraints includes a minimum group size and where adjusting the one or more groups of user identifiers further may include operations, features, means, or instructions for removing a group that does not satisfy the minimum group size.

In some examples of the method, apparatuses, and non-transitory computer-readable medium described herein, the one or more constraints includes a maximum group size and where adjusting the one or more groups of user identifiers further may include operations, features, means, or instructions for removing a group that does not satisfy the maximum group size.

Some examples of the method, apparatuses, and non-transitory computer-readable medium described herein may further include operations, features, means, or instructions for identifying at least one user identifier from each of the one or more groups as a target identifier.

In some examples of the method, apparatuses, and non-transitory computer-readable medium described herein, the target identifiers may be identified based on the connection metric associated with the target identifier satisfying a target identifier threshold.

It should be noted that the methods described herein describe possible implementations, and that the operations and the steps may be rearranged or otherwise modified and that other implementations are possible. Furthermore, aspects from two or more of the methods may be combined.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for data processing at a data server, comprising:
generating, by the data server, one or more groups of user identifiers from a distributed graph representation of connections between a plurality of user identifiers, each of the plurality of user identifiers associated with at least one of a source organization and a target organization, the distributed graph representation of connections being stored at the data server and generated by the data server based on digital communications between user devices associated with the plurality of user identifiers;
identifying, for each of the one or more groups, a connection metric corresponding to each of the user identifiers associated with the target organization, the identified connection metrics based at least in part on one or more interaction factors associated with interactions between the plurality of user identifiers, the one or more interaction factors generated by the data server based at least in part on the digital communications detected between user devices associated with the plurality of user identifiers;
identifying one or more user identifiers associated with the target organization from the one or more groups of user identifiers as one or more target identifiers, the identifying based at least in part on the connection metrics assigned to each of the user identifiers associated with the target organization; and
transmitting a digital communication message including an indication of the one or more target identifiers to a user device associated with the source organization.

2. The method of claim 1, further comprising:
removing user identifiers associated with the source organization from the distributed graph representation of connections to generate the one or more groups.

3. The method of claim 1, further comprising:
generating edges between one or more of the user identifiers of each of the one or more groups of user identifiers, the edges generated based at least in part on the interactions between the user identifiers of each of the groups; and
applying weights to the edges based on an interaction type of the interactions.

4. The method of claim 3, wherein the type of the interactions includes direct email, indirect email, meeting, or a combination thereof.

5. The method of claim 3, further comprising:
applying the weights to the edges further based at least in part on recency of communication, frequency of communication, timing of communication, or a combination thereof.

6. The method of claim 3, further comprising:
applying a reverse page rank algorithm to each of the one or more groups to generate the connection metric, the reverse page rank algorithm generating the connection metrics using at least the weighted edges.

7. The method of claim 1, further comprising:
generating a rationale associated with the one or more target identifiers, the rationale including an indication of one or more of the connection metrics associated with each of the one or more target identifiers.

8. The method of claim 7, wherein the transmitted digital communication message further includes the generated rationale.

9. The method of claim 1, wherein the interaction factors include recency of communication, frequency of communication, type of interaction, or a combination thereof.

10. The method of claim 1, further comprising:
determining whether the one or more groups of user identifiers generated from the distributed graph representation satisfy one or more constraints; and
adjusting the one or more groups of user identifiers based on the determining.

11. The method of claim 10, wherein the one or more constraints includes a minimum group size and wherein adjusting the one or more groups of user identifiers further comprises:
removing a group that does not satisfy the minimum group size.

12. The method of claim 10, wherein the one or more constraints includes a maximum group size and wherein adjusting the one or more groups of user identifiers further comprises:
removing a group that does not satisfy the maximum group size.

13. The method of claim 1, further comprising:
identifying at least one user identifier from each of the one or more groups as a target identifier.

14. The method of claim 1, wherein the target identifiers are identified based on the connection metric associated with the target identifier satisfying a target identifier threshold.

15. An apparatus for data processing at a data server, comprising:
a processor,
memory in electronic communication with the processor; and
instructions stored in the memory and executable by the processor to cause the apparatus to:
generate, by the data server, one or more groups of user identifiers from a distributed graph representation of connections between a plurality of user identifiers, each of the plurality of user identifiers associated with at least one of a source organization and a target organization, the distributed graph representation of connections being stored at the data server and generated by the data server based on digital communications between user devices associated with the plurality of user identifiers;
identify, for each of the one or more groups, a connection metric corresponding to each of the user identifiers associated with the target organization, the identified connection metrics based at least in part on one or more interaction factors associated with interactions between the plurality of user identifiers, the one or more interaction factors generated by the data server based at least in part on the digital communications detected between user devices associated with the plurality of user identifiers;
identify one or more user identifiers associated with the target organization from the one or more groups of user identifiers as one or more target identifiers, the identifying based at least in part on the connection metrics assigned to each of the user identifiers associated with the target organization; and transmit a digital communication message including an indication of the one or more target identifiers to a user device associated with the source organization.

16. The apparatus of claim 15, wherein the instructions are further executable by the processor to cause the apparatus to:
remove user identifiers associated with the source organization from the distributed graph representation of connections to generate the one or more groups.

17. The apparatus of claim 15, wherein the instructions are further executable by the processor to cause the apparatus to:
generate edges between one or more of the user identifiers of each of the one or more groups of user identifiers, the edges generated based at least in part on the interactions between the user identifiers of each of the groups; and
apply weights to the edges based on an interaction type of the interactions.

18. A non-transitory computer-readable medium storing code for data processing at a data server, the code comprising instructions executable by a processor to:
generate, by the data server, one or more groups of user identifiers from a distributed graph representation of connections between a plurality of user identifiers, each of the plurality of user identifiers associated with at least one of a source organization and a target organization, the distributed graph representation of connections being stored at the data server and generated by the data server based on digital communications between user devices associated with the plurality of user identifiers;
identify, for each of the one or more groups, a connection metric corresponding to each of the user identifiers associated with the target organization, the identified connection metrics based at least in part on one or more interaction factors associated with interactions between the plurality of user identifiers, the one or more interaction factors generated by the data server based at least in part on the digital communications detected between user devices associated with the plurality of user identifiers;
identify one or more user identifiers associated with the target organization from the one or more groups of user identifiers as one or more target identifiers, the identifying based at least in part on the connection metrics assigned to each of the user identifiers associated with the target organization; and
transmit a digital communication message including an indication of the one or more target identifiers to a user device associated with the source organization.

19. The non-transitory computer-readable medium of claim 18, wherein the instructions are further executable to:
remove user identifiers associated with the source organization from the distributed graph representation of connections to generate the one or more groups.

20. The non-transitory computer-readable medium of claim 18, wherein the instructions are further executable to:
generate edges between one or more of the user identifiers of each of the one or more groups of user identifiers, the edges generated based at least in part on the interactions between the user identifiers of each of the groups; and
apply weights to the edges based on an interaction type of the interactions, a timing of the interactions, or a combination thereof.

* * * * *